(12) United States Patent
Perez Rodriguez et al.

(10) Patent No.: US 7,770,846 B2
(45) Date of Patent: Aug. 10, 2010

(54) FIXING SYSTEM FOR A LEADING EDGE TO THE STRUCTURE OF AN AIRCRAFT LIFT PLANE

(75) Inventors: David Perez Rodriguez, Madrid (ES); Jorge Ballestero Mendez, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 750 days.

(21) Appl. No.: 11/797,028

(22) Filed: Apr. 30, 2007

(65) Prior Publication Data
US 2008/0001035 A1 Jan. 3, 2008

(30) Foreign Application Priority Data
Jun. 30, 2006 (ES) ................. 200601821

(51) Int. Cl.
*B64C 21/06* (2006.01)
(52) U.S. Cl. ............... 244/209; 244/131; 244/123.1; 244/123.7
(58) Field of Classification Search .............. 244/123.7, 244/131, 123.1, 35 R, 209
See application file for complete search history.

(56) References Cited

U.S. PATENT DOCUMENTS

| 2,150,546 | A | * | 3/1939 | Flader | 244/117 R |
| 5,899,416 | A | * | 5/1999 | Meister et al. | 244/207 |
| 6,050,523 | A | * | 4/2000 | Kraenzien | 244/123.1 |
| 6,116,539 | A | * | 9/2000 | Williams et al. | 244/46 |
| 6,415,510 | B2 | * | 7/2002 | Mertens et al. | 29/897.2 |

* cited by examiner

*Primary Examiner*—Timothy D Collins
*Assistant Examiner*—Justin Benedik
(74) *Attorney, Agent, or Firm*—Wenderoth, Lind & Ponack, L.L.P.

(57) ABSTRACT

Fixing system for a modular leading edge (2) to the structure of an aircraft lift plane (1), in which the leading edge (2) has a covering (4) formed from a first lamina (5) and a second lamina (6) between which there is an interior airtight chamber, and the fixing system comprises a main attachment element (3) whose cross-section has a central element (13), a first arm (14) which is fixed to the first lamina (5) of the covering (4) of the leading edge (2), and a second arm (15) which is fixed to the second lamina (6) of the covering (4), and the central element (13) is in turn fixed to a covering (10) of the torsion box (8) of the structure of the lift plane (1).

19 Claims, 2 Drawing Sheets

FIXING SYSTEM FOR A LEADING EDGE TO THE STRUCTURE OF AN AIRCRAFT LIFT PLANE

TECHNICAL FIELD OF THE INVENTION

This invention belongs to the technical field of fixing systems for leading edges to surfaces in the aeronautical sector, and more particularly to the field of fixing systems for leading edges to the structure of an aircraft lift plane, and more particularly yet to the fixing of leading edges to the structure of a stabiliser.

STATE OF THE PRIOR ART OF THE INVENTION

In the great majority of aerodynamic surfaces, such as aircraft lift planes or stabilisers, it is desirable to fix a leading edge to the structure of those aerodynamic surfaces in order to improve the aerodynamic properties of the surface, causing the flow exterior to that leading edge to be laminar and decreasing as far as possible the aerodynamic resistance existing in flying conditions, thus achieving a reduction in fuel consumption with the saving and preservation of the environment that this implies, in addition to less wear and deterioration of the mechanical structures.

This leading edge that improves the aerodynamic properties of surfaces includes a covering formed from two laminas of titanium, between which are formed the suction chambers necessary for the proper functioning of the leading edge.

Currently, in order to fit a leading edge of these characteristics to the structure of an aerodynamic surface such as a lift plane or stabiliser, various different systems are used that as far as possible guarantee certain adequate aerodynamic properties.

One of these systems consists of using blind rivets with a special machinable head for giving it the desired shape.

Another method consists of using rivets with a high precision tolerance.

An alternative system consists of using rivets and in addition using sacrificing caps to cover them. This solution entails the additional fitting to the structure of a machined metallic strut and a triangular wedge or spacer.

These systems have the disadvantage of difficulty of assembly owing to the machining they need and the high tolerance, together with the need to use a larger number of additional elements which make the structure more complex and heavier.

A system was therefore desirable that would solve the problems existing in the state of the art.

DESCRIPTION OF THE INVENTION

The aim of the present invention is to overcome the drawbacks of the state of the art described above by means of a fixing system for a leading edge to the structure of an aircraft lift plane.

Said fixing system succeeds in fixing the leading edge to the structure of a lift plane in a way that is simple, thereby permitting a simple and potentially automatic fitting, thus achieving an aerodynamic flow exterior to said leading edge that is laminar, thereby improving the aerodynamic properties of the surface without the need for additional elements such as machined metallic struts or triangular wedges or spacers seen above in some of the solutions in the state of the art.

The leading edge sought to be fixed to the structure of a lift plane by means of the present invention comprises a covering formed from a first lamina and a second lamina which house inside them an interior airtight chamber divided into a plurality of suction chambers. The leading edge also comprises a leading edge rib which in general is a plane element attached to the covering by means of a skirt, and which can be joined to the covering of the torsion box or to the forward spar of the torsion box. The leading edge rib ensures the maintenance of the aerodynamic profile of the covering of the leading edge, and ensures that loads are transmitted from the leading edge to the torsion box in cases in which the rib is attached to said forward spar.

The fixing system forming the inventive object comprises a main attachment element whose cross-section comprises a central element from which two arms emerge. The first arm of the main attachment element is fixed to the first arm of the covering of the leading edge by means of attachment and the second arm of the main attachment element is fixed to the second arm of the covering of the leading edge by means of attachment. In addition, the central element is fixed to a covering of the torsion box of the lift plane structure, the leading edge thereby remaining fixed to the lift plane structure.

The advantage of the present invention compared to the solutions existing in the state of the art is that, in a way that is easy and with simple assembly, this fixing system provides complete sealing in the interior chamber of the covering, achieving a perfect functioning of the leading edge and causing the aerodynamic flow exterior to that leading edge to be laminar. Moreover, this system facilitates the modularity and adaptation of leading edges to different configurations and sizes of lift plane, facilitating the fitting and removal of that leading edge.

Furthermore, by means of this fixing system the roughness inherent to the attachment of the leading edge to the lift plane structure of the aircraft is reduced to the minimum, with which the aerodynamic properties are notably improved.

In a particular embodiment of the invention, the fixing system includes in addition a support piece which is fixed via its lower part to the core of the forward spar of the torsion box of the lift plane by means of some first fixing means, and via its upper part to the central element of the main attachment element.

The first fixing means used for fixing the support piece to the central element of the main attachment element and to the forward spar of the torsion box of the lift plane can be fixed or detachable, the latter presenting the advantage of greater ease of fitting and detachment of the leading edge to and from the lift plane structure.

With this additional support piece certain advantages are obtained concerning greater safety and greater stability in the fixing, together with additional support for the fixing of the leading edge, and a better transmission of loads from the leading edge to the lift plane structure.

In one embodiment of the fixing means of the first arm of the main attachment element with the first lamina of the covering and the means of attachment of the second arm of the main attachment element with the second lamina of the covering, these means are welding means.

In this embodiment the means of attachment present the advantage of a firm and secure attachment of the elements.

In another embodiment, the means of attachment are adhesive means, which present the advantage of being less costly than welding means. Each of these means of attachment will be used according to the particular needs of each case.

In a preferred embodiment of the invention, the main attachment element of the fixing system is made of titanium, and the support piece is made of carbon fibre. This embodiment grants resistance to the loads supported by the fixing system and at the same time grants lightness to said system.

In a preferred embodiment of the invention, the main attachment element 3 has a cross-section in the shape of a tuning fork, which complies with the requirements demanded of a configuration that is simple and easy to produce. In a particular embodiment of the main attachment element, the first arm and second arm are symmetric with respect to the central element.

This symmetric design provides greater ease of manufacture compared to other designs in which the arms are different, and it also provides a balanced transmission of the loads from the leading edge to the lift plane structure of the aircraft.

In a particular embodiment of the support piece, this has a cross-section in the form of an L, which provides adequate fixing to surfaces in perpendicular directions, as is the case, with a great manufacturing simplicity.

In addition, the support piece can be fixed to a skirt or skirts of the covering of the torsion box of the lift plane structure by means of some second fixing means, in such a way that a much more stable and resistant, and therefore safer, fixing is achieved of the leading edge.

Said second fixing means, used for fixing the support piece to the skirts, in a preferred embodiment of the invention, are rivets countersunk in order to avoid projections and protuberances in the different surfaces where they are applied.

In another particular embodiment, the leading edge rib has an extension of its skirt that is prolonged as far as being fixed to the support piece of the attachment of the leading edge to the lift plane structure of the aircraft.

BRIEF DESCRIPTION OF THE FIGURES

Below, in order to facilitate a better understanding of this specification and forming an integral part thereof, some drawings are attached in which, on an illustrative rather than limiting basis, the object of the invention has been represented in some of its different embodiments.

Figure 1:
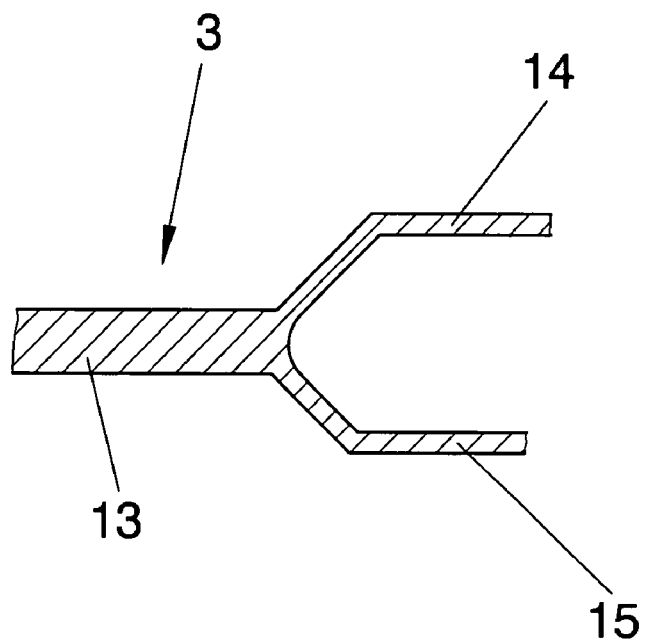
FIG. 1 is a view in cross-section of an embodiment of the main attachment element of the fixing system.

Appearing in these figures are numerical references identifying the following elements:

1 Structure of the lift plane
2 Leading edge
3 Main attachment element
4 Covering of the leading edge
5 First lamina of the covering of the leading edge
6 Second lamina of the covering of the leading edge
7 Suction chamber
8 Torsion box
9 Support piece
10 Covering of the torsion box for the lift plane
11, 12 Skirts of the covering of the torsion box for the lift plane
13 Central element of the main attachment element
14 First arm of the main attachment element
15 Second arm of the main attachment element
16 First fixing means, rivets
17 Second fixing means, nails
18 Lower segment of the support piece
19 Skirt of the leading edge rib
20 Upper segment of the support piece
21 Leading edge rib
22 Forward spar of the torsion box of the lift plane

MODES OF EMBODIMENT OF THE INVENTION

The present invention is a fixing system for a leading edge 2 to the lift plane structure 1 of an aircraft with the aim of improving the aerodynamic properties in-fight.

Figure 4:
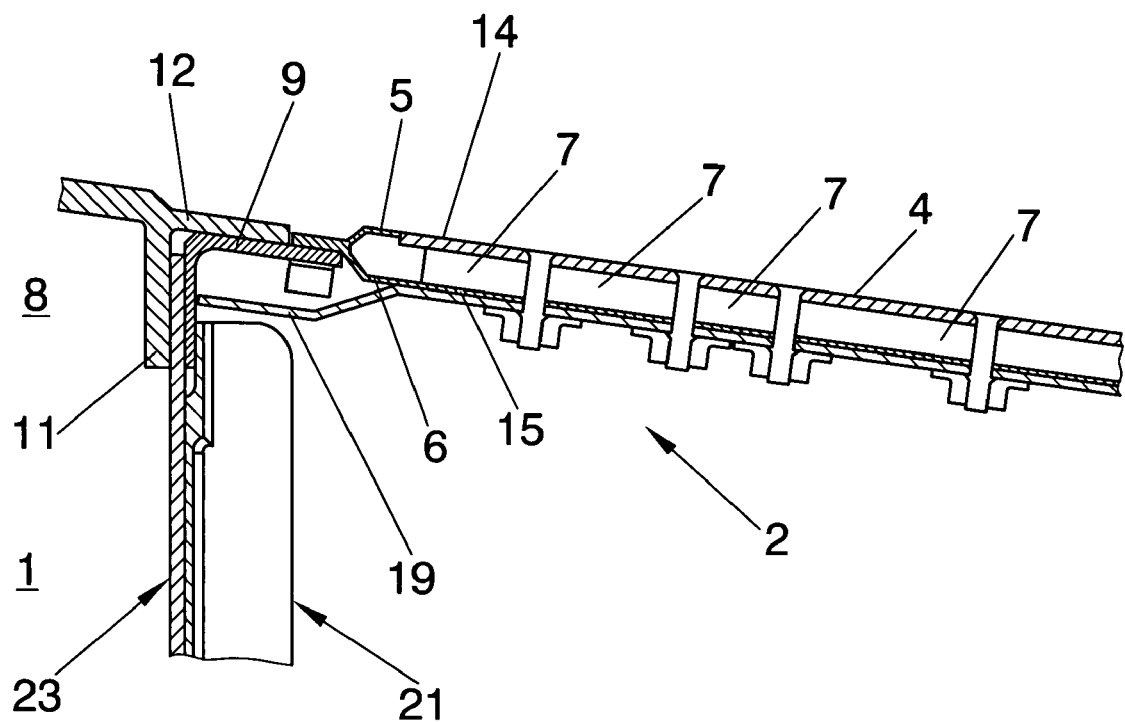
FIG. 4 is a view in cross-section of the entire fixing system of the invention, according to a particular embodiment, attached to the torsion box and to the leading edge of the lift plane.

As can be seen in FIG. 4, the leading edge 2 comprises a covering 4, said covering 4 being formed from a first lamina 5 and a second lamina 6. Said laminas 5, 6 house a airtight interior chamber inside them. This interior chamber is divided into a plurality of suction chambers 7, the number of which will depend on the extension of the leading edge 2.

In addition, the leading edge 2 comprises a leading edge rib 21. This leading edge rib 21 is an element with a generally plane geometry, which is joined to the covering 4 of the leading edge 2 by means of a skirt 19 of the leading edge rib 21, and which may or may not be joined to the forward spar 22 of the torsion box 8 of the lift plane 1. This leading edge rib 21 ensures the maintenance of the aerodynamic profile of the covering 4 of the leading edge 2 and provides it with elasticity, and at the same time it transmits the loads from the leading edge 2 to the torsion box 8 of the lift plane structure 1 in cases in which the leading edge rib 21 is attached to said forward spar 22 of the torsion box 8.

Figure 2:
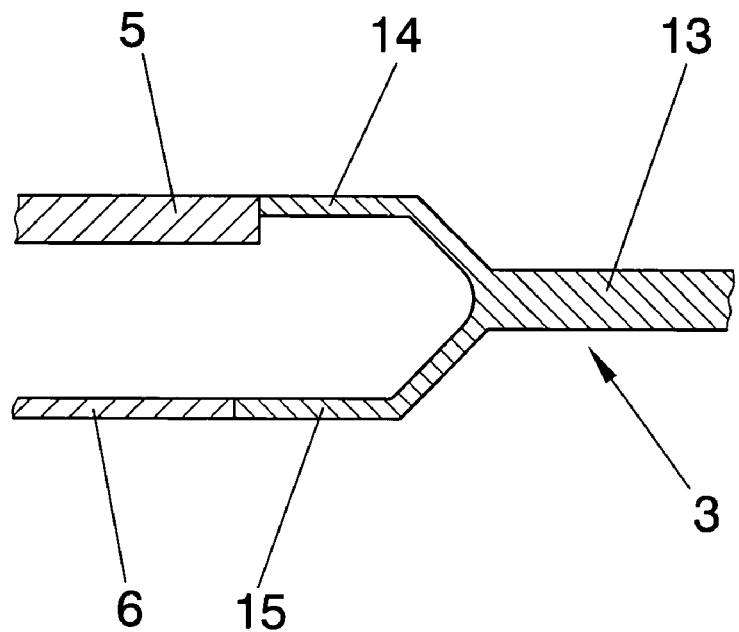
FIG. 2 is a view in cross-section of the main attachment element of the fixing system attached to a leading edge of the lift plane of an aircraft.

As shown in FIGS. 1, 2 and 4, the fixing system forming the inventive object comprises a main attachment element 3 whose cross-section comprises a central element 13 from which emerge a first arm 14 and a second arm 15. FIG. 2 shows in detail the arrangement of the two arms 14, 15. As can be seen in said FIG. 2, the first arm 14 of the main attachment element 3 is fixed by means of attachment to the first lamina 5 of the covering 4 of the leading edge 2 and the second arm 15 of the main attachment element 3 is fixed by means of attachment to the second lamina 6 of the covering 4 of the leading edge 2.

As can be seen in FIG. 4, at the other end of the main attachment element 3, the central element 13 is fixed to a covering 10 of the torsion box 8 of the lift plane structure 1.

In this way, the leading edge 2 remains fixed simply and securely to the lift plane structure 1.

In an embodiment of the invention, the means of attachment of the first arm 14 of the main attachment element 3 with the first lamina 5 of the covering 4 of the leading edge 2, and the means of attachment of the second arm 15 of the main attachment element 3 with the second lamina 6 of the covering 4 are welding means, which has the advantage of a firm and secure attachment of the elements. In an alternative embodiment, both the means of attachment of the first arm 14 with the first lamina 5 and the means of attachment of the second arm 15 with the second lamina 6 are adhesive means, which present the advantage of lower cost, though the firmness of the attachment is less. Depending on the needs of attachment in different fixings of the leading edge 2 to lift plane structures 1 of aircraft, one or the other will be used.

The present invention offers a series of advantages with regard to the solutions existing in the state of the art. First of all, the system provides a simple fitting of the leading edge 2 to the lift plane structure 1, and it achieves a perfect functioning of that leading edge 2 and causes the aerodynamic flow exterior to that leading edge 2 to be laminar. Moreover, this system facilitates the modularity and adaptation of leading edges 2 to different configurations and sizes of lift plane 1, facilitating their fitting and removal. Also, owing to the configuration of the system and its simplicity, the roughness that always exists in attachments of the leading edges 2 to the lift plane structures of aircraft is reduced to the minimum, with which the aerodynamic properties are notably improved.

Figure 3:
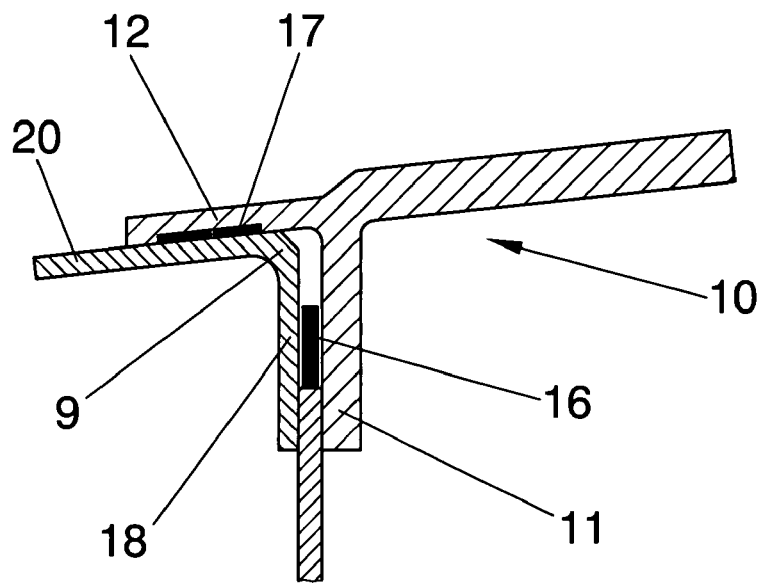
FIG. 3 is a view in cross-section of the support piece of the fixing system attached to the torsion box of the lift plane.

FIGS. 3 and 4 show a preferred embodiment of the fixing system forming the inventive object in which the system includes a support piece 9 which increases the firmness and stability of the fixing by providing an additional support, at the same time as improving the transmission of loads from the leading edge 2 to the lift plane structure 1.

FIG. 3 shows the configuration of the support piece 9. Said support piece 9 comprises a lower segment 18 and an upper segment 20. As can be seen in FIGS. 3 and 4, the upper segment 20 is fixed to the central element 13 of the main attachment element 3, and the lower segment 18 is fixed to a forward spar 22 of the torsion box 8 of the lift plane 1 by means of some first fixing means 16.

The first fixing means 16 used for fixing the support piece 9 to the central element 13 of the main attachment element 3 and to the forward spar 22 of the torsion box 8 of the lift plane 1 can be fixed or detachable, the latter presenting the advantage of greater ease of fitting and detachment of the leading edge 2 to and from the lift plane structure 1.

FIGS. 3 and 4 show a preferred embodiment of the support piece 9 which has a cross-section in the form of an L. The advantage of this configuration is that adequate fixing is achieved of the system to surfaces in perpendicular directions with a great manufacturing simplicity for that support piece 9.

In a preferred embodiment of the invention, the main attachment element 3 is made of titanium, and the support piece 9 is made of carbon fibre, thus granting high resistance to the loads supported and transmitted by the fixing system and at the same time achieving lightness of said system, with the result that the efficiency will be greater due to performing the same functions but with less fuel consumption on account of not having to move very heavy parts.

In FIGS. 1 and 2 a preferred embodiment of the invention can be seen in which the main attachment element 3 has a cross-section in the shape of a tuning fork, which complies with the requirements demanded of a configuration that is simple and easy to produce. Additionally, in a particular embodiment, as shown in FIGS. 1 and 2, the first arm 14 and second arm 15 of the main attachment element 3 are equal and symmetric with respect to the central element 13. This symmetric design grants greater ease of manufacturing compared to other designs in which the arms 14, 15 are different. Also, this embodiment is used for a balanced transmission of loads from the leading edge 2 to the lift plane structure of the aircraft.

FIG. 4 show a particular embodiment of the fixing system forming the inventive object in which the support piece 9, as well as being fixed to the forward spar 22 of the torsion box 8 of the lift plane 1, is also fixed to fixed some skirts 11, 12 of the covering 10 of the torsion box 8, or just to one of them depending on the securing needs, by means of some second fixing means 17. This embodiment provides the advantage of achieving a fixing of the leading edge 2 that is much more stable and resistant, and therefore safer.

Preferably, the second fixing means used for fixing the support piece to the skirts are rivets countersunk in order to avoid projections and protuberances in the different surfaces where they are applied.

In another particular embodiment, the leading edge rib 21 has an extension of its skirt 19 that is prolonged as far as the lower segment 18 of the support piece 9 and said lower segment 18 of the support piece 9 is fixed to the extension of the skirt 19 of the leading edge rib 21, with which the attachment becomes much more secure.

The invention claimed is:

1. A fixing system for fixing a modular leading edge to a lift plane structure of an aircraft, said leading edge comprising
a covering including a first lamina and a second lamina,
an airtight interior chamber divided into a plurality of suction chambers, arranged between the first lamina and the second lamina, and
a plane leading edge rib, which comprises a skirt of the leading edge rib, said leading edge rib being attached to the covering by the skirt of the leading edge rib, said fixing system comprising a main attachment element whose cross-section comprises a central element from which emerge a first arm and a second arm, the first arm of the main attachment element being fixed by attachment to the first lamina of the covering of the leading edge and the second arm of the main attachment element being fixed by attachment to the second lamina of the covering of the leading edge, and the central element of the main attachment element is fixed to a covering of a torsion box of the lift plane structure, the leading edge remaining fixed to the lift plane structure.

2. A fixing system for fixing a leading edge to the lift plane structure of the aircraft, according to claim 1, further comprising a support piece which comprises a lower segment and an upper segment, the support piece being fixed via said upper segment to the central element of the main attachment element and via said lower segment to a forward spar of the torsion box of the lift plane via some first fixing means.

3. A fixing system for fixing a leading edge to the lift plane structure of the aircraft, according to-claim 2, wherein the support piece is produced of carbon fiber.

4. A fixing system for fixing a leading edge to the lift plane structure of the aircraft, according to-claim 2, wherein the support piece has a cross-section in the form of an L.

5. A fixing system for fixing a leading edge to the lift plane structure of the aircraft, according to-claim 2, wherein the support piece is additionally attached to some skirts of the covering of the torsion box of the lift plane structure via second fixing means.

6. A fixing system for fixing a leading edge to the lift plane structure of the aircraft, according to-claim 5, wherein the second fixing means are countersunk rivets.

7. A fixing system for fixing a leading edge to the lift plane structure of the aircraft, according to-claim 2, wherein the first fixing means are fixed.

8. A fixing system for fixing a leading edge to the lift plane structure of the aircraft, according to-claim 2, wherein the first fixing means are detachable.

9. A fixing system for fixing a leading edge to the lift plane structure of the aircraft, according to claim 2, wherein the first arm of the main attachment element is attached to the first lamina of the covering and the second arm of the main attachment element is attached to the second lamina of the covering by welding.

10. A fixing system for fixing a leading edge to the lift plane structure of the aircraft, according to claim 2, wherein the first arm of the main attachment element is attached to the first lamina of the covering and the second arm of the main attachment element is attached to the second lamina of the covering by adhesive.

11. A fixing system for fixing a leading edge to the lift plane structure of the aircraft, according to claim 2, wherein the main attachment element is produced of titanium.

12. A fixing system for fixing a leading edge to the lift plane structure of the aircraft, according to claim 2, wherein the main attachment element has a cross-section in the shape of a tuning fork.

13. A fixing system for fixing a leading edge to the lift plane structure of the aircraft, according to claim 2, wherein the leading edge rib comprises an extension of its skirt which is extended as far as the lower segment of the support piece, said lower segment of the support piece being fixed to the extension of the skirt of the leading edge rib.

14. A fixing system for fixing a leading edge to the lift plane structure of the aircraft, according to claim 1, wherein the first arm of the main attachment element is attached to the first lamina of the covering and the second arm of the main attachment element is attached to the second lamina of the covering by welding.

15. A fixing system for fixing a leading edge to the lift plane structure of the aircraft, according to claim 1, wherein the first arm of the main attachment element is attached to the first lamina of the covering and the second arm of the main attachment element is attached to the second lamina of the covering by adhesive.

16. A fixing system for fixing a leading edge to the lift plane structure of the aircraft, according to-claim 1, wherein the main attachment element is produced of titanium.

17. A fixing system for fixing a leading edge to the lift plane structure of the aircraft, according to-claim 1, wherein the main attachment element has a cross-section in the shape of a tuning fork.

18. A fixing system for fixing a leading edge to the lift plane structure of the aircraft, according to claim 17, wherein the first arm and the second arm are equal and symmetric with respect to the central element.

19. A fixing system for fixing a leading edge to the lift plane structure of the aircraft, according to-claim 1, wherein the leading edge rib comprises an extension of its skirt which is extended as far as the lower segment of the support piece, said lower segment of the support piece being fixed to the extension of the skirt of the leading edge rib.

* * * * *